(12) United States Patent
Chen et al.

(10) Patent No.: US 7,949,327 B2
(45) Date of Patent: May 24, 2011

(54) METHOD AND APPARATUS FOR RECEPTION OF LONG RANGE SIGNALS IN BLUETOOTH

(75) Inventors: Albert Chen, Hsinchu (TW);
Kuang-Ping Ma, Hsinchu (TW);
Wen-Tso Huang, Hsinchu (TW)

(73) Assignee: Integrated System Solution Corp., Hsinchu (TW)

( * ) Notice: Subject to any disclaimer, the term of this patent is extended or adjusted under 35 U.S.C. 154(b) by 1342 days.

(21) Appl. No.: 11/435,948

(22) Filed: May 18, 2006

(65) Prior Publication Data
US 2007/0270098 A1 Nov. 22, 2007

(51) Int. Cl.
*H04M 1/66* (2006.01)
(52) U.S. Cl. ............... 455/410; 455/456.1; 455/132; 375/329; 375/219; 375/260; 375/348; 375/350
(58) Field of Classification Search .............. 455/42, 455/41.2, 456.1, 132; 375/329, 219, 260, 375/348, 350
See application file for complete search history.

(56) References Cited

U.S. PATENT DOCUMENTS

| | | | | |
|---|---|---|---|---|
| 2002/0039388 | A1* | 4/2002 | Smart et al. | 375/260 |
| 2003/0086485 | A1* | 5/2003 | Lin et al. | 375/219 |
| 2005/0036575 | A1* | 2/2005 | Kuchi et al. | 375/348 |
| 2005/0185743 | A1* | 8/2005 | Li | 375/350 |
| 2006/0013339 | A1* | 1/2006 | Salloum Salazar | 375/329 |
| 2006/0116091 | A1* | 6/2006 | Hammes et al. | 455/132 |
| 2007/0202890 | A1* | 8/2007 | Feher | 455/456.1 |

OTHER PUBLICATIONS

Haartsen et al., IEEE Proceedings of the IEEE, Oct. 2000, pp. 1651-1661, vol. 88, No. 10.
Klein, IEEE, Mar. 1997, pp. 203-207.
Falconer et al., White Paper: Frequency Domain Equalization for Single-Carrier Braoadband Wireless Systems, pp. 1-26.

* cited by examiner

*Primary Examiner* — Lester Kincaid
*Assistant Examiner* — Charles Shedrick
(74) *Attorney, Agent, or Firm* — Muncy, Geissler, Olds & Lowe, PLLC

(57) ABSTRACT

The invention of a method and an apparatus for reception of long transmission range Bluetooth signals impaired by multipath are disclosed. The new reception method and apparatus proposed allows to increase the transmission range for data transmission in Bluetooth. The invention proposes the use of a new FDE adapted to SC transmission without a GI or CP. The proposed FDE very successfully mitigates ISI while being very implementation-friendly.

9 Claims, 23 Drawing Sheets
(23 of 23 Drawing Sheet(s) Filed in Color)

METHOD AND APPARATUS FOR RECEPTION OF LONG RANGE SIGNALS IN BLUETOOTH

BACKGROUND OF THE INVENTION

1. Field of the Invention

The present invention relates to a method and apparatus for reception of Bluetooth signals, and more especially, to a method and apparatus for reception of long-range signals in Bluetooth.

2. Background of the Related Art

The Bluetooth standard distinguishes devices by their so-called power class {[IEEE 802.15.1], [BT SIG 1.2], [BT SIG EDR]}. For each power class, a maximum output power (Pmax), a nominal output power and a minimum output power is specified as shown in Table 1.

TABLE 1

| Power Class | Maximum Output Power (Pmax) | Nominal Output Power | Minimum Output Power | Power Control |
|---|---|---|---|---|
| 1 | 100 mW (20 dBm) | N/A | 1 mW (0 dB) | Pmin < +4 dBm to Pmax Optional: Pmin$^2$ to Pmax |
| 2 | 2.5 mW (4 dBm) | 1 mW (0 dBm) | 0.25 mW (−6 dBm) | Optional: Pmin$^2$ to Pmax |
| 3 | 1 mW (0 dBm) | N/A | N/A | Optional: Pmin$^2$ to Pmax |

The Bluetooth technology is intended to implement wireless personal area networks (WPAN). Therefore, the typical range of Bluetooth devices is expected to be limited to about 10 meters. Bluetooth devices according to power class 1, however, are capable to transmit over a range significantly larger than the so-called personal operating space (POS) of about 10 meters.

[IEEE 802.15.1]: the IEEE Std 802.15.1-IEEE Standard for Information technology Telecommunications and information exchange between systems Local and metropolitan area networks Specific requirements-Part 15.1: Wireless Medium Access Control (MAC) and Physical Layer (PHY) Specifications for Wireless Personal Area Networks (WPANs), 14 Jun. 2002.

[BT SIG 1.2]: Bluetooth SIG Specification of the Bluetooth System, Version 1.2, 5 Nov. 2003.

[BT SIG EDR]: Bluetooth SIG Specification of the Bluetooth System with EDR, Version 2.0, 4 Nov. 2004.

Sensitivity Performance in Bluetooth

In [BT SIG EDR], a reference sensitivity level of −70 dBm is given for an uncoded bit error rate (BER) of 0.0001 (0.01%). In FIG. 1 and FIG. 2, the uncoded BER versus SNR is shown for PI/4-DQPSK and D8PSK, respectively. For PI/4-DQPSK, about 14 dB SNR are needed to achieve an uncoded BER of 0.01%. For D8PSK, about 20 dB SNR are needed to achieve an uncoded BER of 0.01%. Additional SNR margin is needed to accommodate fixed-point implementation losses as well as losses introduced by radio front end impairments and non-ideal time and frequency synchronization. Therefore, about 25 dB SNR are assumed to achieve an uncoded BER of 0.01%.

Path Loss in Bluetooth

The signal power received by a Bluetooth device depending on the signal power transmitted by another Bluetooth device is given by Equation 1:

$$P_{RX} = P_{XT} - L_{path} - L_{Fade} + G_{TX} + G_{RX} \quad (1)$$

with
- $P_{RX}$: received signal power
- $P_{TX}$: transmitted signal power
- $L_{Path}$: path loss
- $L_{Fade}$: fade margin
- $G_{TX}$: received antenna gain
- $G_{RX}$: transmit antenna gain The following assumptions are applied in Equation 2 and Equation 3:

$$G_{TX} = G_{RX} = 0 \text{ dBi} \quad (2)$$

$$L_{Fade} = 8 \text{ dB} \quad (3)$$

Therefore, based on Equation 1 and Equation 2, the path loss is given by Equation 4:

$$L_{Path} = P_{TX} - P_{RX} - 8 \text{ dB} \quad (4)$$

The transmitted signal power under consideration (maximum signal power) is in Equation 5:

$$P_{TX} \Rightarrow P_{TX,max} = 20 \text{ dBm (Power class 1 device)} \quad (5)$$

The received signal power under consideration (minimum signal power) is given by Equation 6:

$$P_{RX} \Rightarrow P_{RX,min} = N_{Floor} + W + SNR_{RX} + NF_{RX} \quad (6)$$

with
- $P_{TX,max}$: maximum transmit power
- $P_{RX,min}$: minimum received power
- $N_{Floor}$: noise floor due to thermal noise
- W: noise bandwidth
- $SNR_{RX}$: signal-to-noise-ratio required for BER=0.0001 for D8PSK
- $NF_{RX}$: receiver noise figure The noise floor due to thermal noise amounts to −174 dBm per Hz signal bandwidth. The signal bandwidth for Bluetooth technology equals 1 MHz. The receiver noise figure is assumed to be 20 dB.

The minimum signal power can now be computed by Equation 7:

$$P_{RX,min} = -174 \text{ dBm/Hz} + 1 \text{ MHz} + 25 \text{ dB} + 20 \text{ dB} \quad (7)$$
$$= -114 \text{ dBm} + 45 \text{ dB}$$
$$= -69 \text{ dBm}$$

The maximum path loss based on maximum transmit signal power and minimum received signal power and fade margin based on Equation 4 is now given by Equation 8:

$$L_{Path,max} = P_{TX,max} - P_{RX,min} - 8 \text{ dB} \quad (8)$$

-continued $$= 20\,dB + 69\,dB - 8\,dB$$

$$= 81\,dB$$

It follows that the maximum path loss for a Bluetooth device of power class 1 equals 81 dB. For power class 2 and power class 3, the maximum path loss amounts to 73 dB and 69 dB, respectively.

On Transmission Range in Bluetooth

The path loss depending on the transmission range for line-of-sight (LOS) conditions in a Bluetooth network is given by Equation 9:

$$L_{Path} = 20\log\left(\frac{2\Pi}{\lambda}R\right) \tag{9}$$

or by Equation 10 approximately $$L_{Path} = 40 + 20\log(R) \tag{10}$$

with
R: transmission range in [meters]
λ: wavelength of transmission signal

The path loss depending on the transmission range for non-line-of-sight (NLOS) conditions in a Bluetooth network is given by Equation 11:

$$L_{Path} = 36\log\left(\frac{4\Pi}{\lambda}R\right) - 46.7\,dB \tag{11}$$

or Equation 12 approximately $$L_{path} = 25.3 + 36\log(R) \tag{12}$$

Equation 9, by Equation 10, Equation 11 and Equation 12 are visualized in FIG. 3. It follows that for a maximum path-loss of 81 dB, a maximum transmission range $R_{max}$ of 113 meters (in large office) is achieved (LOS conditions) using a power class 1 device while ensuring reliable communication. For power class 2 and power class 3, 18 meters (in small office) and 11 meters (POS) are achieved, respectively.

On Multipath Propagation in Bluetooth

In Bluetooth, the symbol rate equals 1 Msps while the symbol duration $T_{Symbol}$ equals 1 μs (1000 ns). According the radio propagation theory, a radio frequency signal propagates 300 m in 1 μs (3e8 meters per second). The maximum echo delay (1st versus 2nd echo) based on the maximum transmission range is given by Equation 13:

$$D_{max} = \frac{T_{Symbol}}{300\,m} \cdot R_{max} \tag{13}$$

$$= \frac{1\,\mu s}{300\,m} 113\,m$$

$$= 377\,ns$$

It follows that for a maximum transmission range $R_{max}$ of 113 meters a maximum echo delay of 377 ns is obtained.

For power class 2 and power class 3, 60 ns and 37 ns are obtained, respectively.

Multipath propagation results in inter-symbol interference (ISI). The amount of ISI introduced depends on the number and power of all echo paths following the first arriving path.

Using the result from Equation 13, one gets a maximum ISI percentage shown in Equation 14:

$$ISI_{max} = \frac{D_{max}}{T_{Symbol}} \tag{14}$$

$$= \frac{377\,ns}{1\,\mu s}$$

$$= 37.7\%$$

For power class 2 and power class 3, 6% and 3.7% are obtained, respectively.

The ISI is modelled as an echo path having a relative power (with regards to the first arriving path) equal to $ISI_{max}$. With that assumption, a worst-case multipath channel profile with a 1st (obstructed) path @ 0 dB w/delay of 0 samples and a 2nd path (echo) @ $10*\log_{10}(0.377) = -4.24$ dB w/delay of 1 sample (1 μs).

The 2-path multipath propagation model for Bluetooth long transmission range applications is shown in FIG. 4. A large office scenario for Bluetooth long transmission range applications is shown in FIG. 5.

Impact of Multipath Propagation on Bluetooth Demodulation Performance

In FIG. 6, FIG. 7, FIG. 8, and FIG. 9, the simulated impact of multipath propagation on Bluetooth EDR demodulation performance is shown.

For the 2-path multipath propagation model, the power of the second path is varied relative to the first arriving path. For the exponential multipath propagation model, the RMS delay spread is varied.

In FIG. 6, one can see that even for Pi/4-DQPSK and a very small second path such as −15 dB ($10\log_{10}(0.0313)$), there is a degradation exceeding 3 dB already. For path larger than −9 dB ($10\log_{10}(0.125)$), successful demodulation is no longer possible independent of the SNR.

In FIG. 7, one can see that even for D8PSK and a very small second path such as −15 dB ($10\log_{10}(0.0313)$), there is a degradation exceeding 12 dB (!) already. For path larger than −15 dB, successful demodulation is no longer possible independent of the SNR.

In FIG. 8, one can see that for Pi/4-DQPSK and an RMS delay spread>250 ns, there is a degradation exceeding 3 dB.

In FIG. 9, one can see that for D8PSK and an RMS delay spread>200 ns, there is a degradation exceeding 3 dB.

It was also shown that even for very moderate multipath propagation, no reliable data transmission using Bluetooth technology is possible. That is due to the inter-symbol interference (ISI) introduced by multipath propagation. Current (state-of-the-art) Bluetooth receivers are not capable of mitigating the unfavorable impact of ISI on the data demodulation in Bluetooth.

It is concluded that with current (state-of-the-art) Bluetooth receivers, no reliable data transmission is possible with regards to transmission ranges provided the transmission power of power class 1 devices.

SUMMARY OF THE INVENTION

In order to solve the problems mentioned above, the present invention provides a method and apparatus for reception of long-range signals in Bluetooth. The present invention processes Bluetooth signals with linear minimum mean square error (MMSE) frequency-domain equalization (FDE)

in single carrier (SC) system using a Fourier Transform and provides long transmission range Bluetooth service with reliable data transmission.

The present invention improves the performance of Bluetooth service based on power class 2 and 3 devices in multipath environment.

The present invention provides FFT/IFFT-based MMSE SC FDE receiver architecture for all Bluetooth transmission modes for low-complexity and high-performance The present invention is used in multi-standard devices in efficient implementation by reuse of the FFT/IFFT circuitry To achieve the purpose mentioned above, one embodiment of the present invention provides a method for reception of long-range signals in Bluetooth is for all transmission modes on power class 1, power class 2 and power class 3, the method comprising: receiving Bluetooth signals; and processing signals with linear frequency-domain equalization (FDE) in single carrier (SC) system using a Fourier Transform.

Furthermore, another embodiment of the present invention provides an apparatus for reception of long-range signals in Bluetooth is for all transmission modes on power class 1, power class 2 and power class, the apparatus comprising: a first equalizer receiving and processing first packet data; a first GPSK demodulator receiving first packet data from first equalizer and demodulating first packet data; an root-raised-cosine (RRC) filter, downsampling second packet data to produce third packet data and fourth packet data; a second equalizer, receiving and processing third packet data and fourth packet data; a Pi/4-DQPSK demodulator receiving third packet data from second equalizer and demodulating third packet data; and an 8-DPSK demodulator receiving fourth packet data from second equalizer and demodulating fourth packet data.

BRIEF DESCRIPTION OF THE DRAWINGS

The file of this patent contains at least one drawing executed in color. Copies of this patent with color drawing(s) will be provided by the Patent and Trademark Office upon request.

The foregoing aspects and many of the accompanying advantages of this invention will becomes more readily appreciated as the same becomes better understood by reference to the following detailed description, when taken in conjunction with the accompanying drawings, wherein.

DETAILED DESCRIPTION OF THE INVENTION

Figure 1:
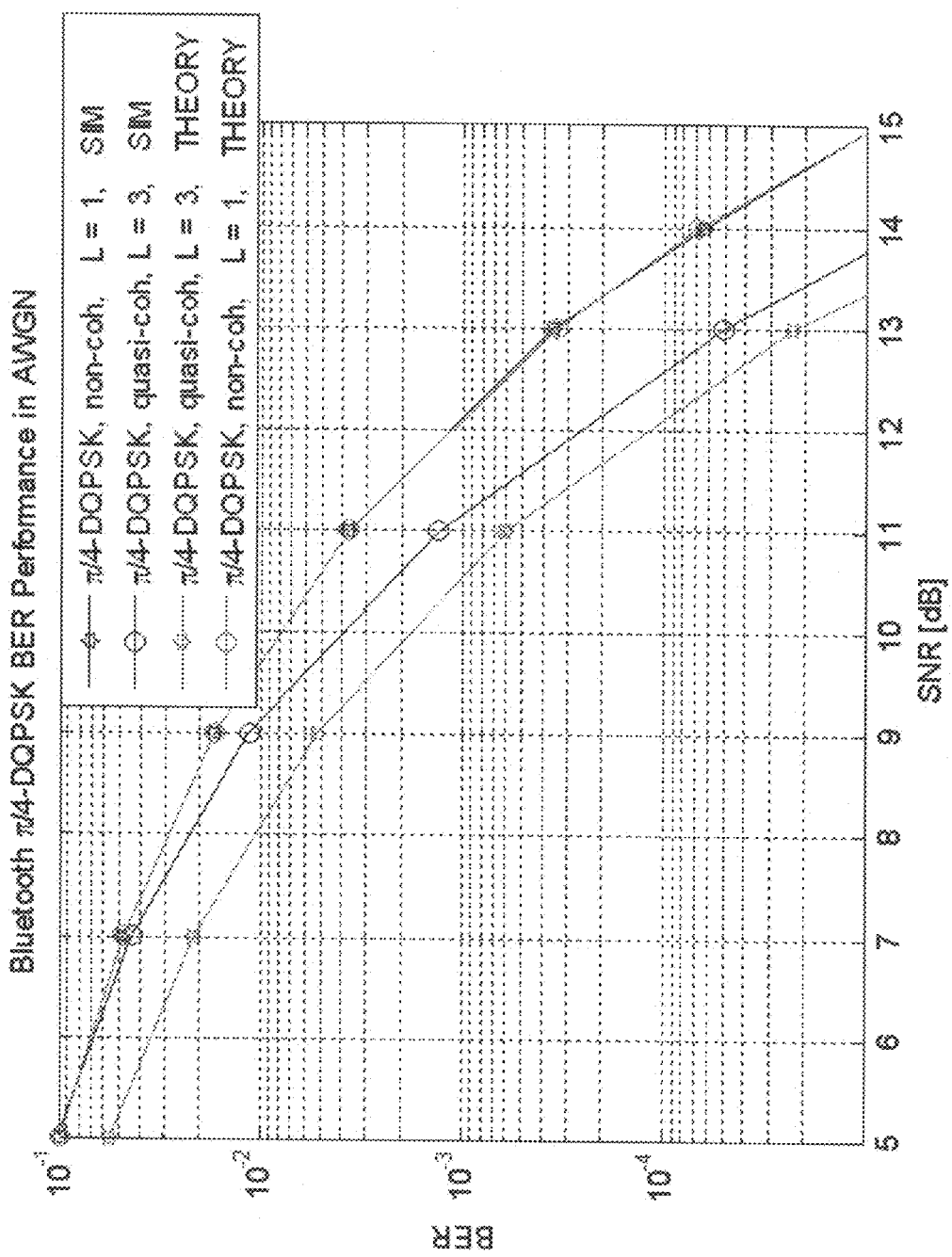
FIG. 1 illustrating BER versus SNR for PI/4-DQPSK in AWGN.
Figure 2:
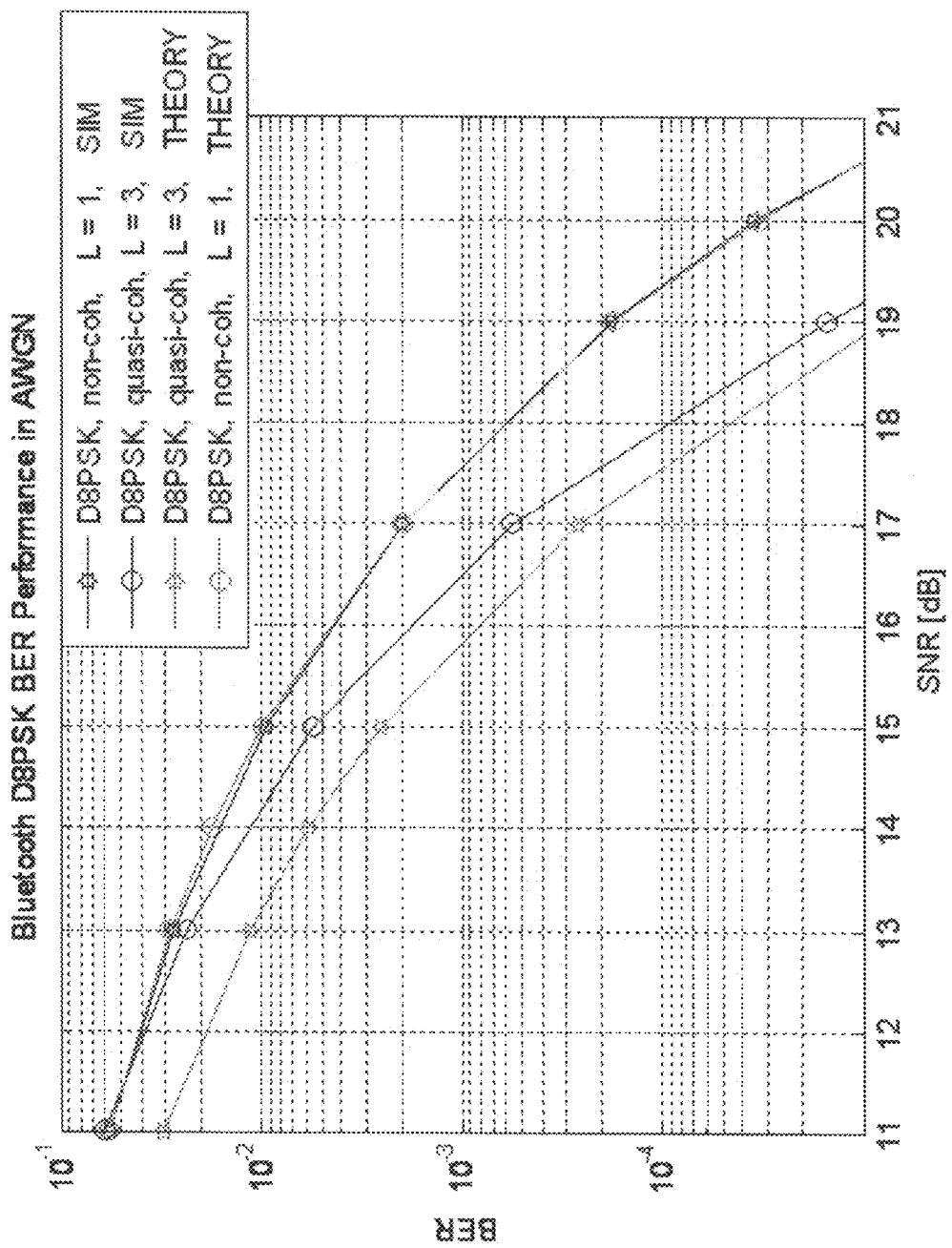
FIG. 2 illustrating BER versus SNR for D8PSK in AWGN.
Figure 3:
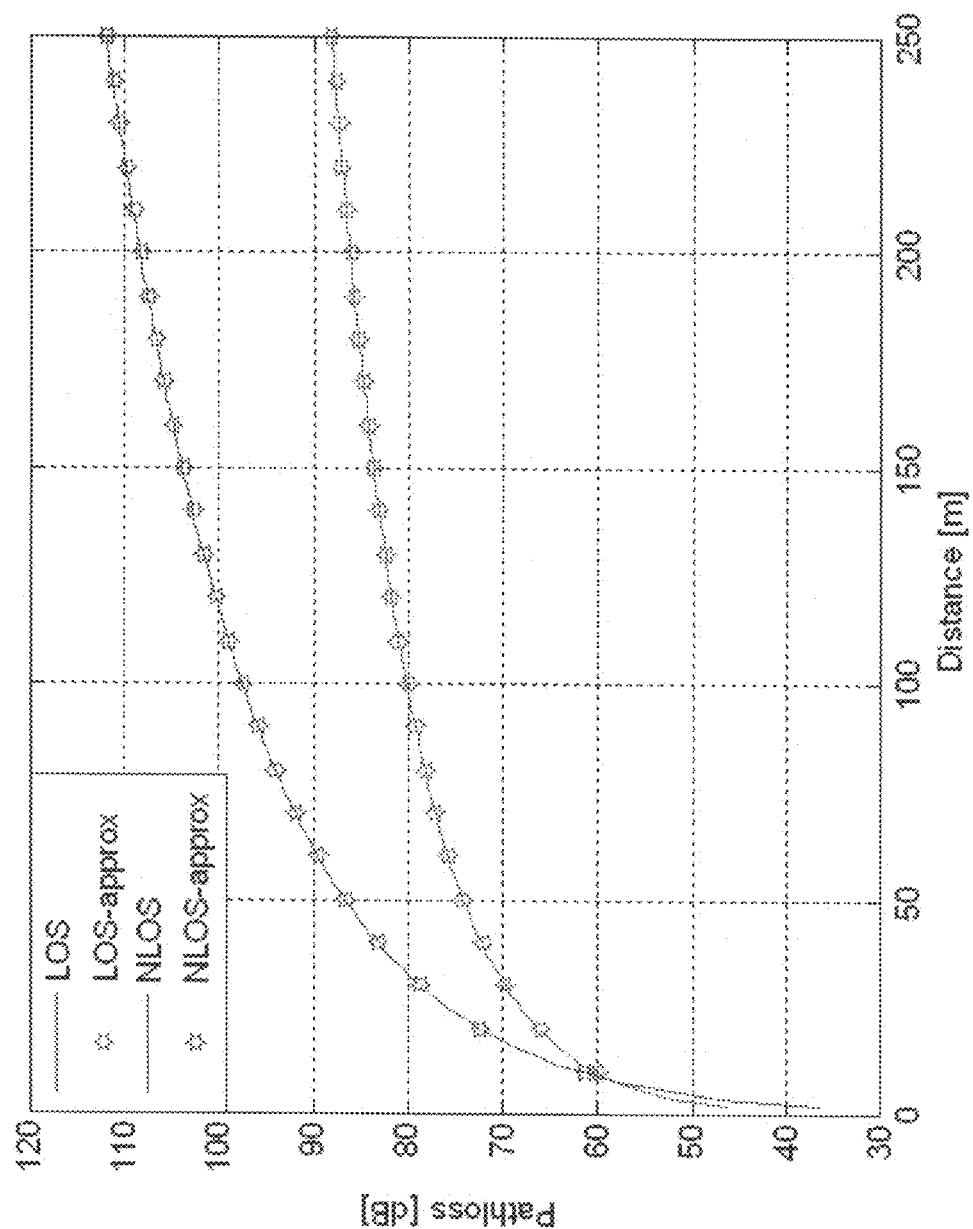
FIG. 3 illustrating the pathloss versus transmission range in a Bluetooth network.
Figure 4:
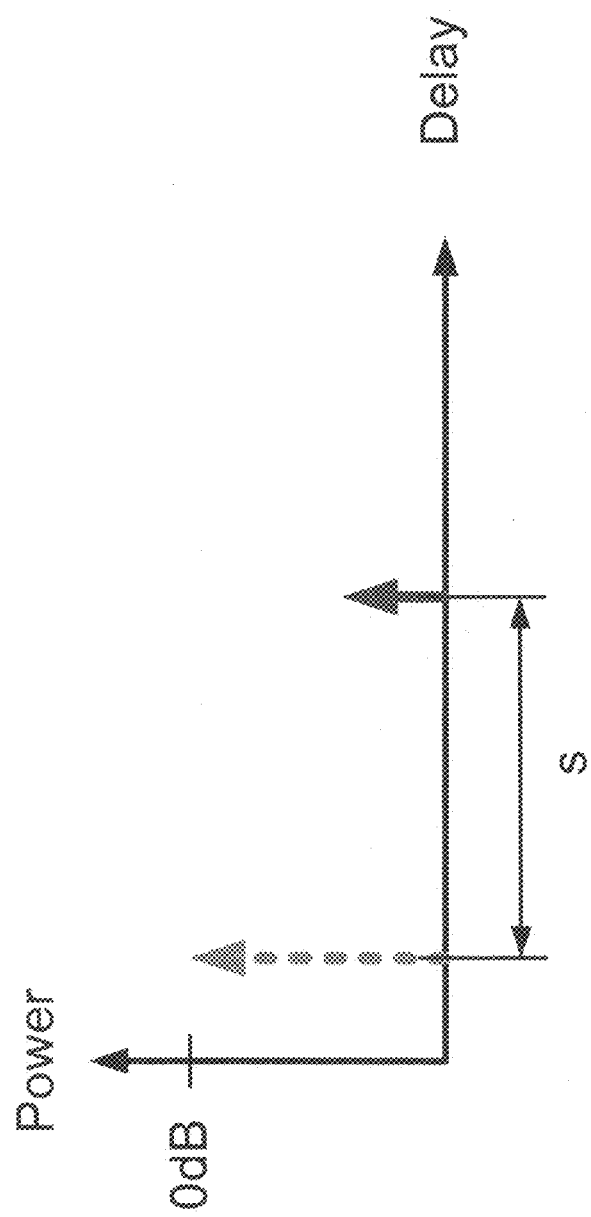
FIG. 4 illustrating 2-path multipath propagation model for Bluetooth long transmission range applications.
Figure 5:
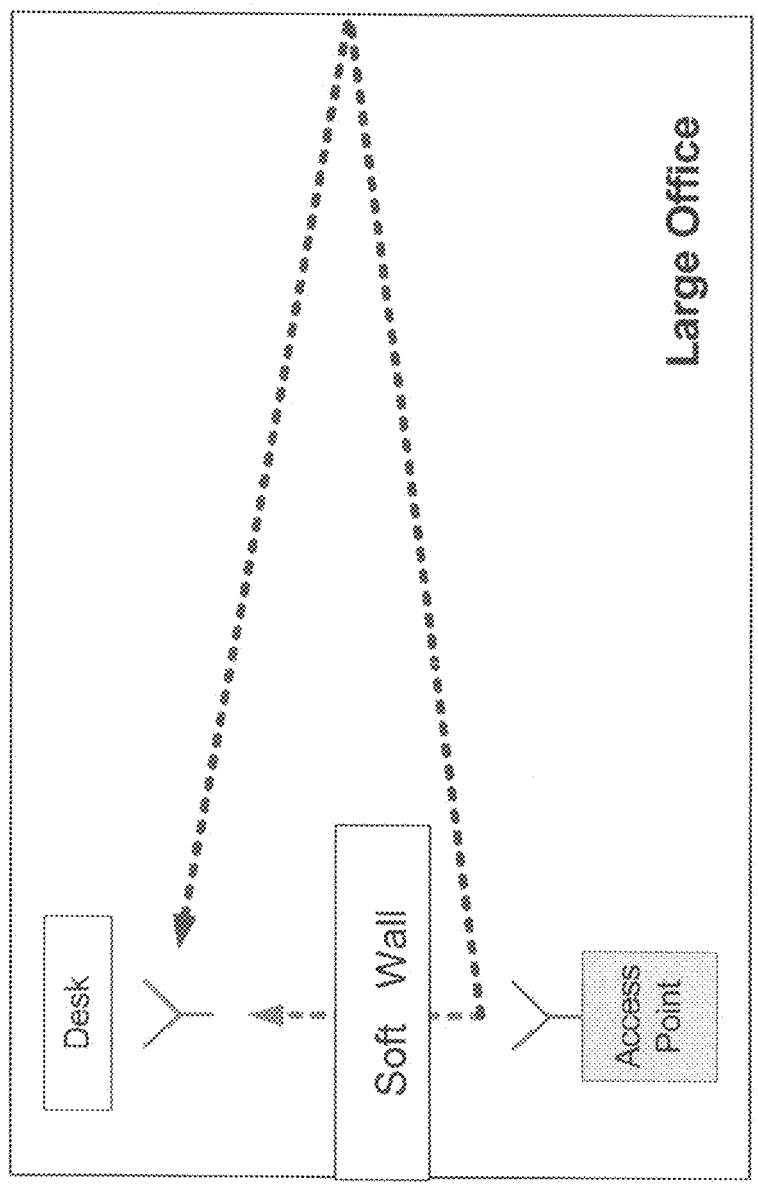
FIG. 5 illustrating the scenario of multipath propagation in large office.
Figure 6:
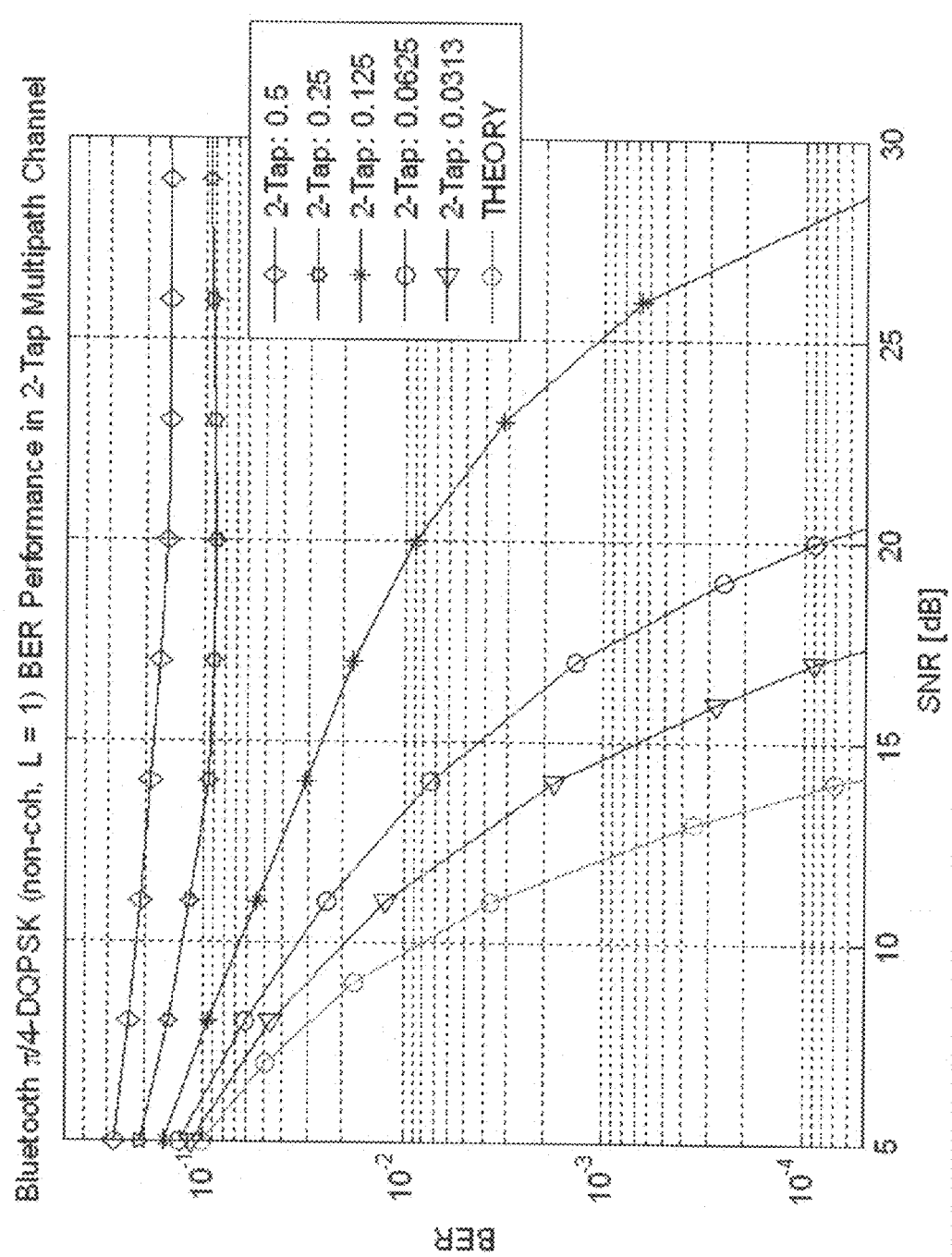
FIG. 6 illustrating the BER performance for Pi/4-DQPSK in 2-Path multipath.
Figure 7:
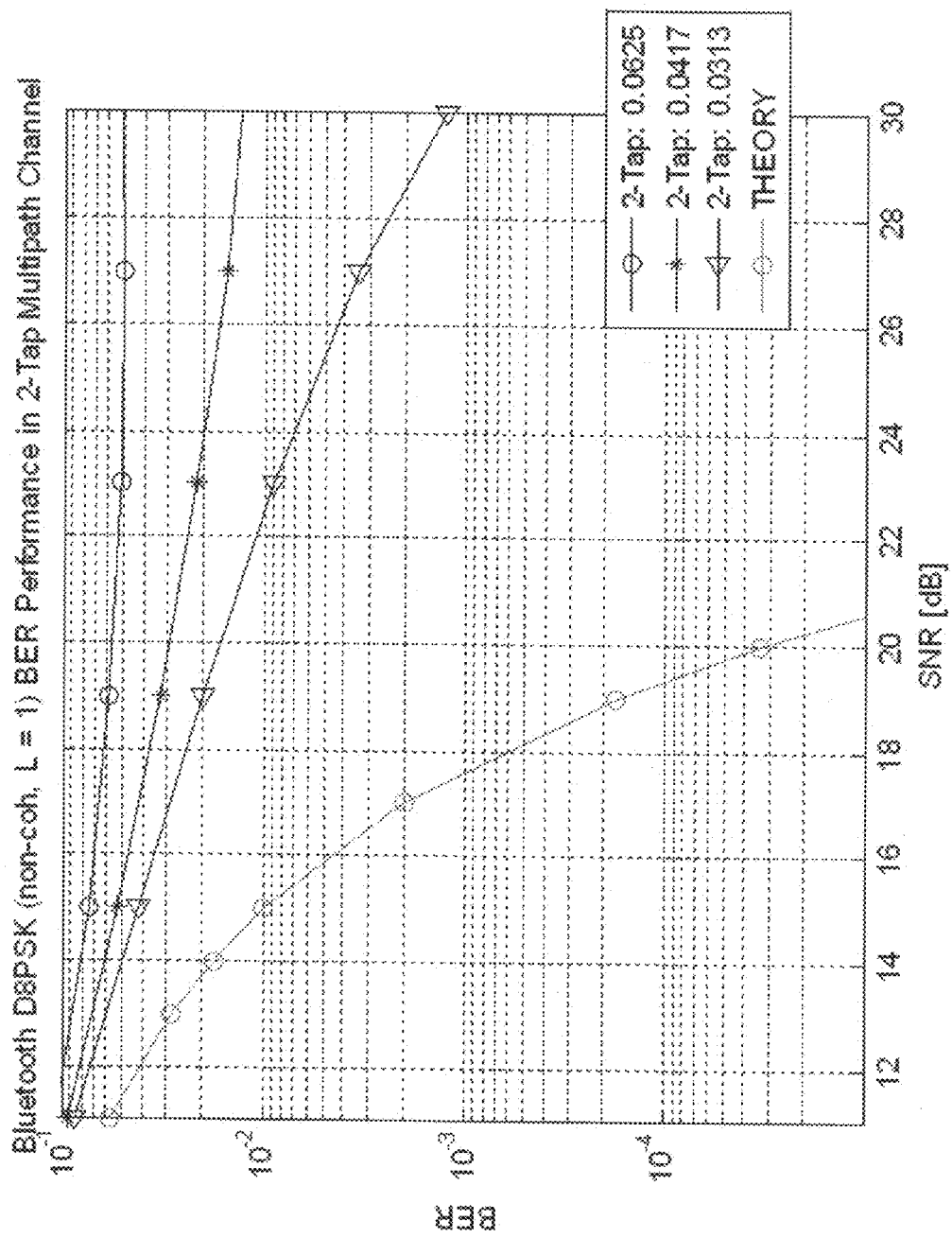
FIG. 7 illustrating the BER performance for D8PSK in 2-path multipath.
Figure 8:
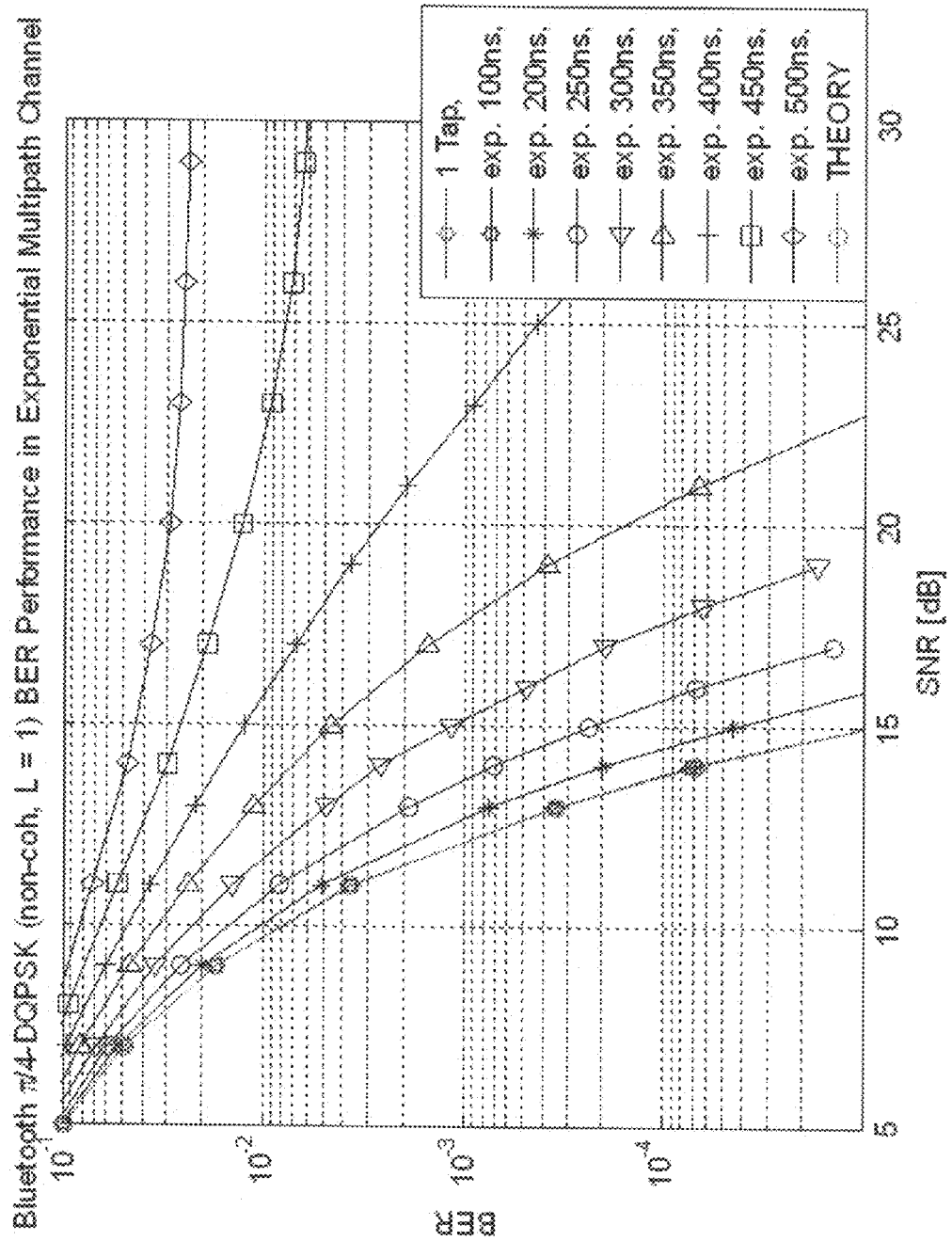
FIG. 8 illustrating the BER performance for Pi/4-DQPSK in exponential multipath.
Figure 9:
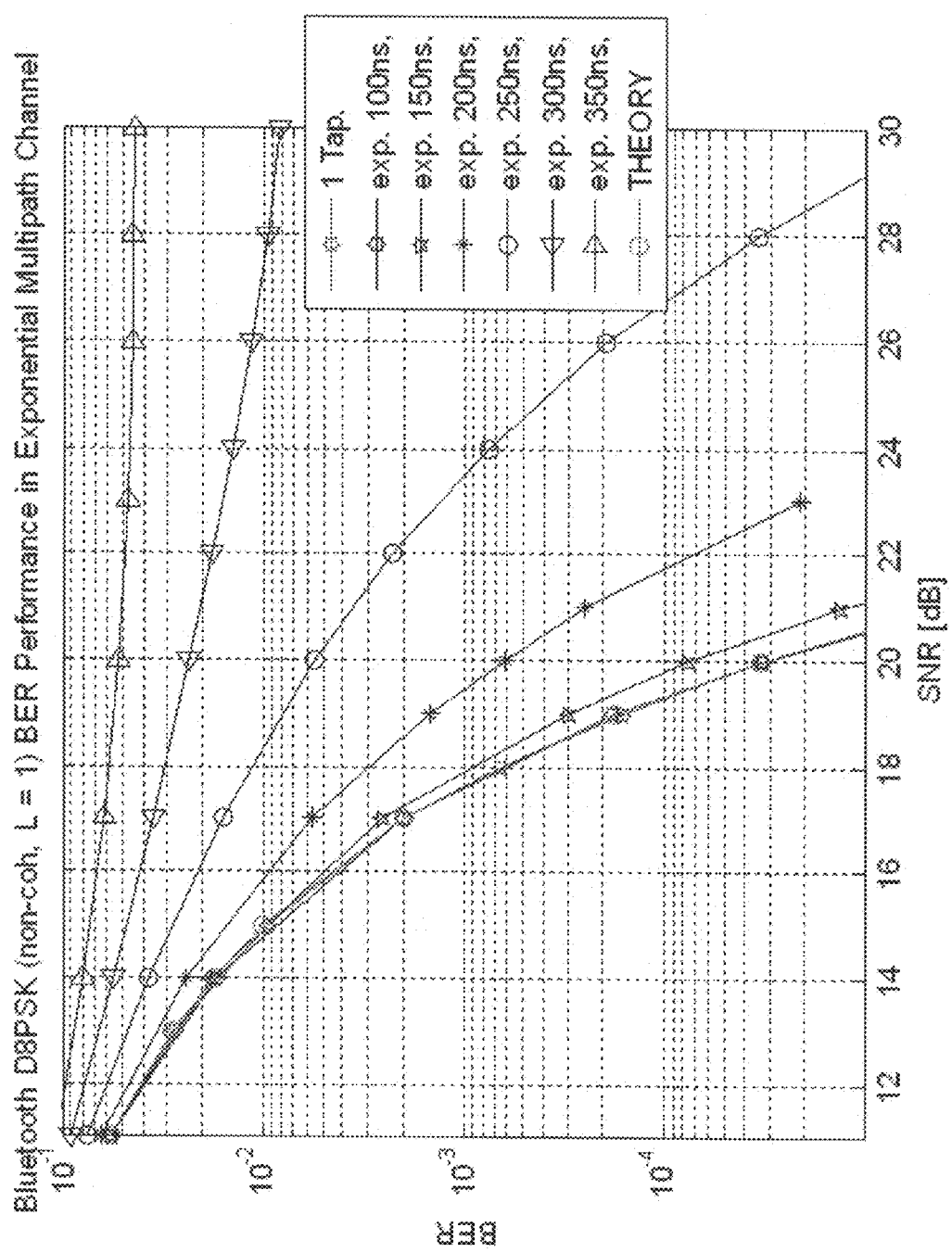
FIG. 9 illustrating the BER performance for D8PSK in exponential multipath.

As an invention, the use of equalization is proposed for Bluetooth data communication.

While ISI mitigation by equalization is well-known in state-of-the-art digital wireless communications engineering, this invention proposes the use of a new FDE adapted to SC transmission without a GI or CP. The proposed FDE very successfully mitigates ISI while being very implementation-friendly.

The resulting performance of long transmission range Bluetooth service based on power class 1 devices using BlueWARP technology is beyond state-of-the-art Bluetooth service based on power class 1 devices.

In the following, a generalized system model is introduced. The model is similar to the one proposed in [Klein].

At the transmit side, a block (vector) d of data of length N is formed in Equation 15:

$$d=(d_1, d_2 \ldots d_N)^T \quad (15)$$

Any coding, modulation or spreading is assumed to be included in d already. The data block is transmit through a channel characterized by its impulse response h in Equation 16:

$$h=(h_1, h_2 \ldots h_W)^T \quad (16)$$

The convolution of d and h is expressed in matrix notation using the matrix H in Equation 17:

$$H=(H_{i,v}), i=1 \ldots N+W-1, v=1 \ldots N \quad (17)$$

with Equation 18:

$$H_{i,v} = \begin{cases} h_{i-v+1} & 1 \le i-v+1 \le W \\ 0 & \text{else} \end{cases} \quad (18)$$

The received signal r is given by Equation 19:

$$r = (r_1, r_2, \ldots r_{N+W-1})^T \quad (19)$$

$$= H \cdot d + n$$

where n denotes an additive white Gaussian noise sequence with zero mean and covariance matrix $R_{nn}$.

Using (block) linear equalization technique for SC systems, an estimate of the transmit data is obtained using one of the following criteria.

Equation 20: Matched Filter (MF) Criterion $$\hat{d}_{MF} = H^H \cdot r \quad (20)$$

Equation 21: Zeros Forcing (ZF) Criterion $$\hat{d}_{ZF} = (H^H \cdot H)^{-1} \cdot H^H \cdot r \quad (21)$$

Equation 22: Minimum Mean Square Error (MMSE) Criterion $$\hat{d}_{MMSE} = (H^H \cdot H + \sigma^2)^{-1} \cdot H^H \cdot r \quad (22)$$

Typically, the MMSE criterion yields superior results. Therefore, only the MMSE criterion is pursued. Nevertheless, all newly proposed receiver architectures are applicable as well to MF or ZF equalization.

Single Carrier Linear MMSE Frequency-Domain Equalization Using FFT without Guard Period In order to avoid complex receiver processing tasks such as Cholesky decomposition for solving Equation 22, the (block) linear MMSE equalization for SC systems can be performed efficiently in frequency domain expressed in Equation 23 and Equation 24:

$$\hat{d}_{MMSE} = F^{-1}\{H_{inv} \cdot F(r)\} \quad (23)$$

$$H_{inv} = \frac{(F\{\hat{h}\})^*}{(F\{\hat{h}\})^* \cdot F\{\hat{h}\} + \sigma^2} \quad (24)$$

where F denotes the Discrete Fourier Transform (DFT), $F^{-1}$ denotes the Inverse Discrete Fourier Transform (IDFT).

ĥ refers to an estimated channel impulse response. The ĥ is obtained by a separate processing step typically called channel estimation.

$H_{inv}$ represents the frequency response of the propagation channel being inverted using the MMSE criterion. Its time-domain equivalent is given by $h_{inv}$.

For actual implementations, DFT and IDFT are realized by Fast Fourier Transform (FFT) and Inverse Fast Fourier Transform (IFFT), respectively.

$H_{inv}$ in Equation 23 can be interpreted as the frequency response of a transversal linear equalizer filter which time (impulse) response has to be convolved with the received signal r. The filter can be categorized as an IIR filter. Therefore, the filter length is infinite. However, a length can be defined which contains most of the large coefficients and neglects small coefficients. The length of this approximated equalizer filter is denoted by $L_{eq}$.

The length of the received data blocks varies significantly depending on packet type and service. A fixed-length FFT/IFFT implementation based on the maximum data block length N of all packet types and services to be integrated in the receiver architecture would not be efficient. Also, N can be rather large (>2^13) which would require to implement a very large FFT (>8 k). However, it is well-known that convolution (e.g. filtering) operations for continuous data streams or long blocks of data can be implemented efficiently using overlap-add-technique (OAT) FFT or overlap-save-technique (OST) FFT algorithms. The further description focuses on OAT FFT.

As suggested in [Falconer], FDE for SC systems requires a GI to be inserted at the transmitter. The following method, however, allows to apply FFT-based FDE as well for systems without GI.

An M-point FFT (M=8, 16, 32, 64) is assumed. For every M-point FFT/IFFT based convolution operation, a length M-$L_{eq}$ output data block is generated. The start index within the data block is advanced by M-$L_{eq}$ samples per FFT-IFFT operation.

The single FFTs/IFFTs overlap by $L_{eq}$ samples. Therefore, $L_{eq}$<M/2 must hold. For such short FFT/IFFT sizes, the approximated equalizer filter must be limited which can be accomplished either by circular convolution with a rectangular window transformed into frequency domain RW (see equation 26) or by multiplication with a rectangular window rw in time domain (see equation 25). The latter approach requires one additional frequency-time and time-frequency conversion. The extended versions of Equation 23 are given below:

$$\hat{d}_{MMSE} = F^{-1}\left\{F\left\{F^{-1}\left\{\frac{(F\{\hat{h}\})^*}{(F\{\hat{h}\})^* \cdot F\{\hat{h}\} + \sigma^2}\right\} \cdot rw\right\} \cdot F(r)\right\} \quad (25)$$

$$\hat{d}_{MMSE} = F^{-1}\left\{\left(\frac{(F\{\hat{h}\})^*}{(F\{\hat{h}\})^* \cdot F\{\hat{h}\} + \sigma^2} \otimes RW\right) \cdot F(r)\right\} \quad (26)$$

⊗denotes circular convolution.

Also, $h_{inv}$ must be shifted into the correct position. Performing this operation in frequency domain corresponds to rotating $H_{inv}$ with phasors having an angle increasing with every sample of $H_{inv}$.

Figure 10:
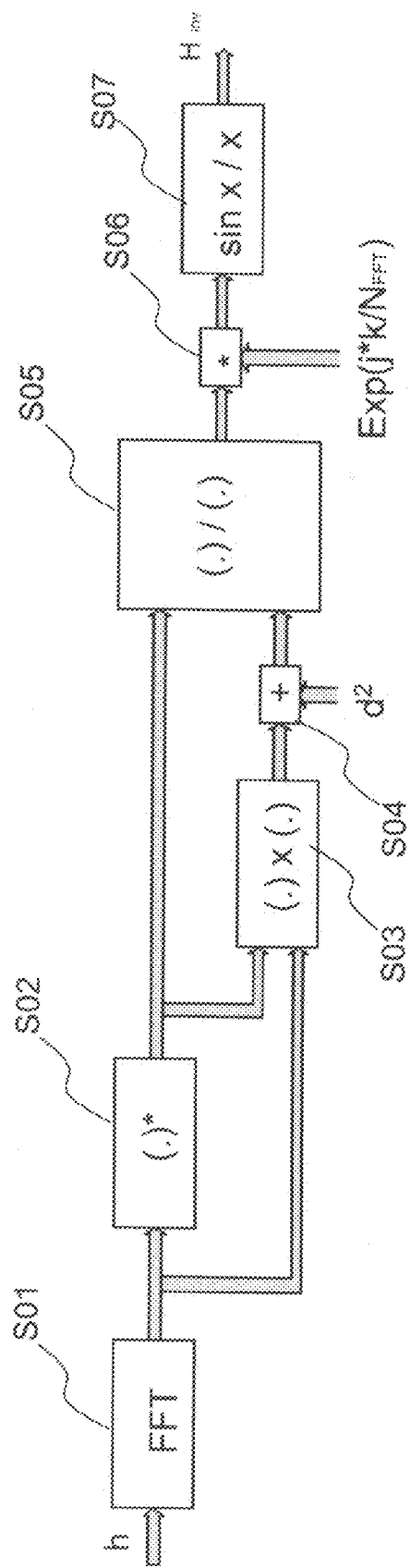
FIG. 10 illustrating the processing flow of h yielding $H_{inv}$ in SC linear MMSE BLE according to one embodiment of the present invention.

In FIG 10, the entire processing flow of ĥyielding $H_{inv}$ is depicted:

S01: FFT on estimated channel impulse response
S02: conjugate complex operation on Ĥ
S03: Multiplication of Ĥ with conj(Ĥ)
S04: Addition of Ĥ·Ĥ* with $\sigma^2$
S05: Division of Ĥ* by Ĥ·Ĥ*+$\sigma^2$.
S06: Multiplication with phasors $$1 \cdot e^{j\frac{k}{M}}$$

S07: Circular convolution with $$\frac{\sin x}{x}$$

SC Linear MMSE FDE

Figure 11:
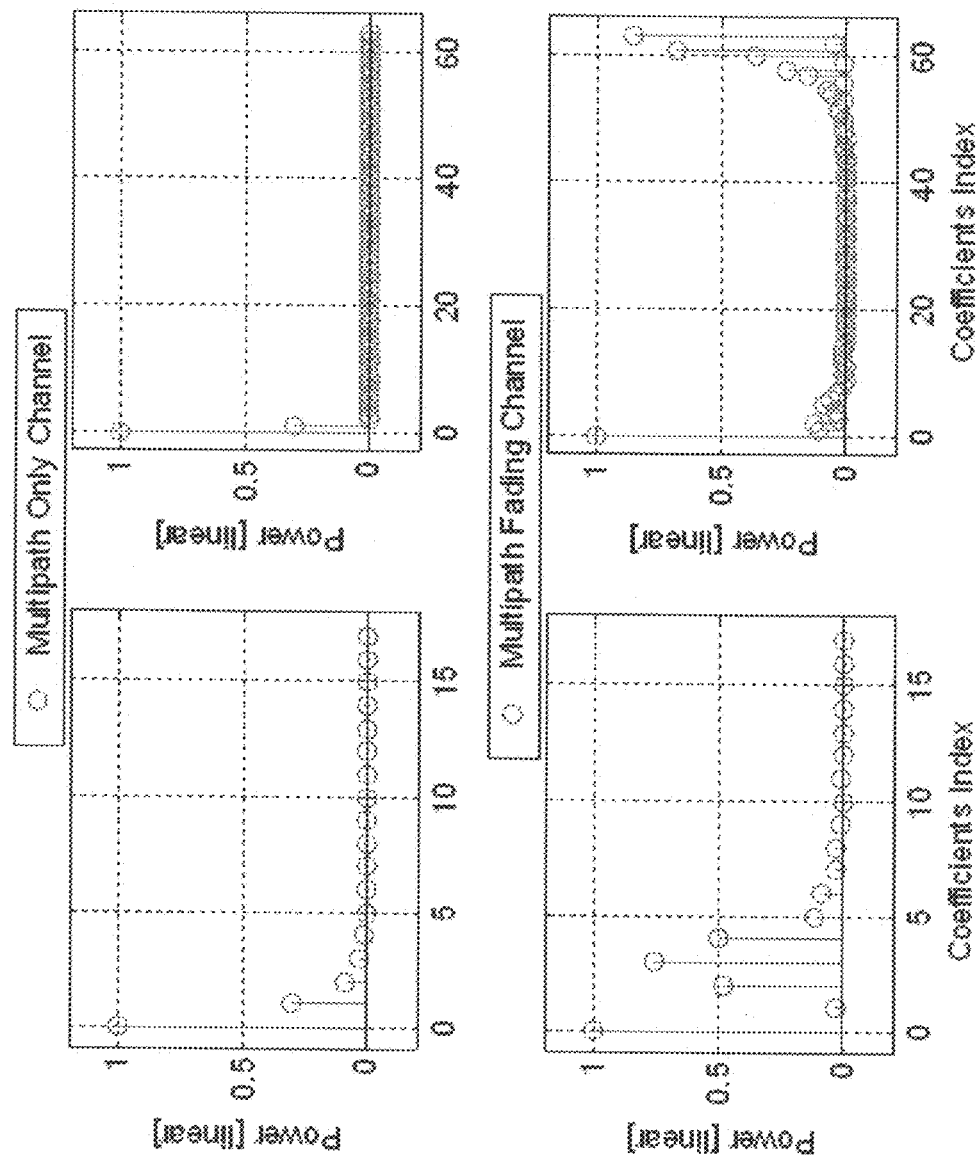
FIG. 11 illustrating h of exponential channel (left) and corresponding $h_{inv}$ using M=64 (right)

In FIG. 11, h of a noiseless exponential multipath channel without fading (upper subplot) and with fading (lower subplot) is shown. The channel parameter RMS delay spread ζwas set to ζ=150 ns. In addition, one can see the corresponding $h_{inv}$ which was obtained by converting $H_{inv}$, from Equation 24 back to time domain.

In order to apply OAT for equalization, $h_{inv}$ has to be shortened to the overlap length M/2. This shortened $h_{inv}$ is constructed using the last quarter of samples of $h_{inv}$ and appending the first quarter of samples of $h_{inv}$ to it.

Figure 12:
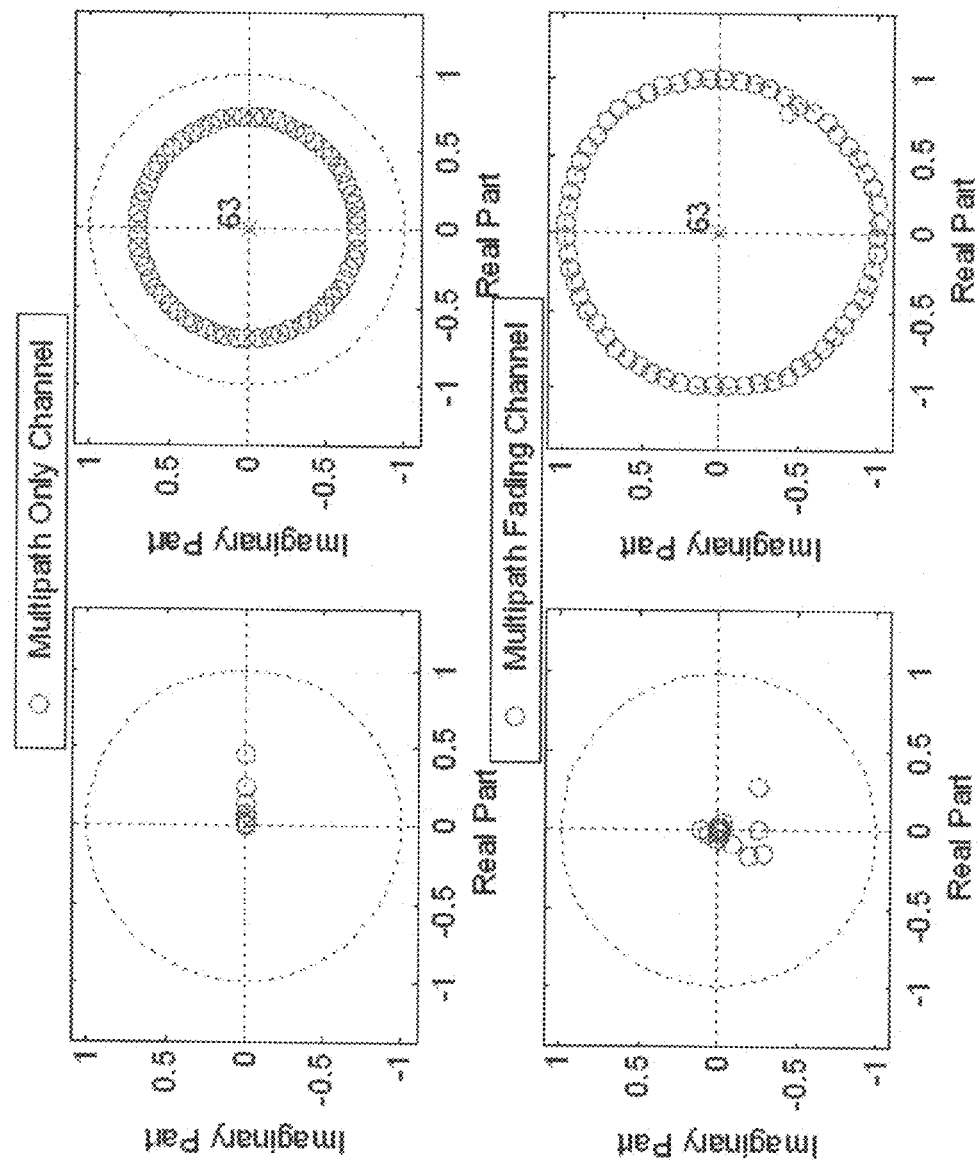
FIG. 12 illustrating the Pole-Zero Diagrams of h of exponential channel (left) and corresponding $h_{inv}$ using M=64 (right)

In FIG. 12, one can see the impact of the minimum-phase/non-minimum phase character of the non-fading/fading exponential channel on the pole-zero diagrams of h and $h_{inv}$.

Figure 13:
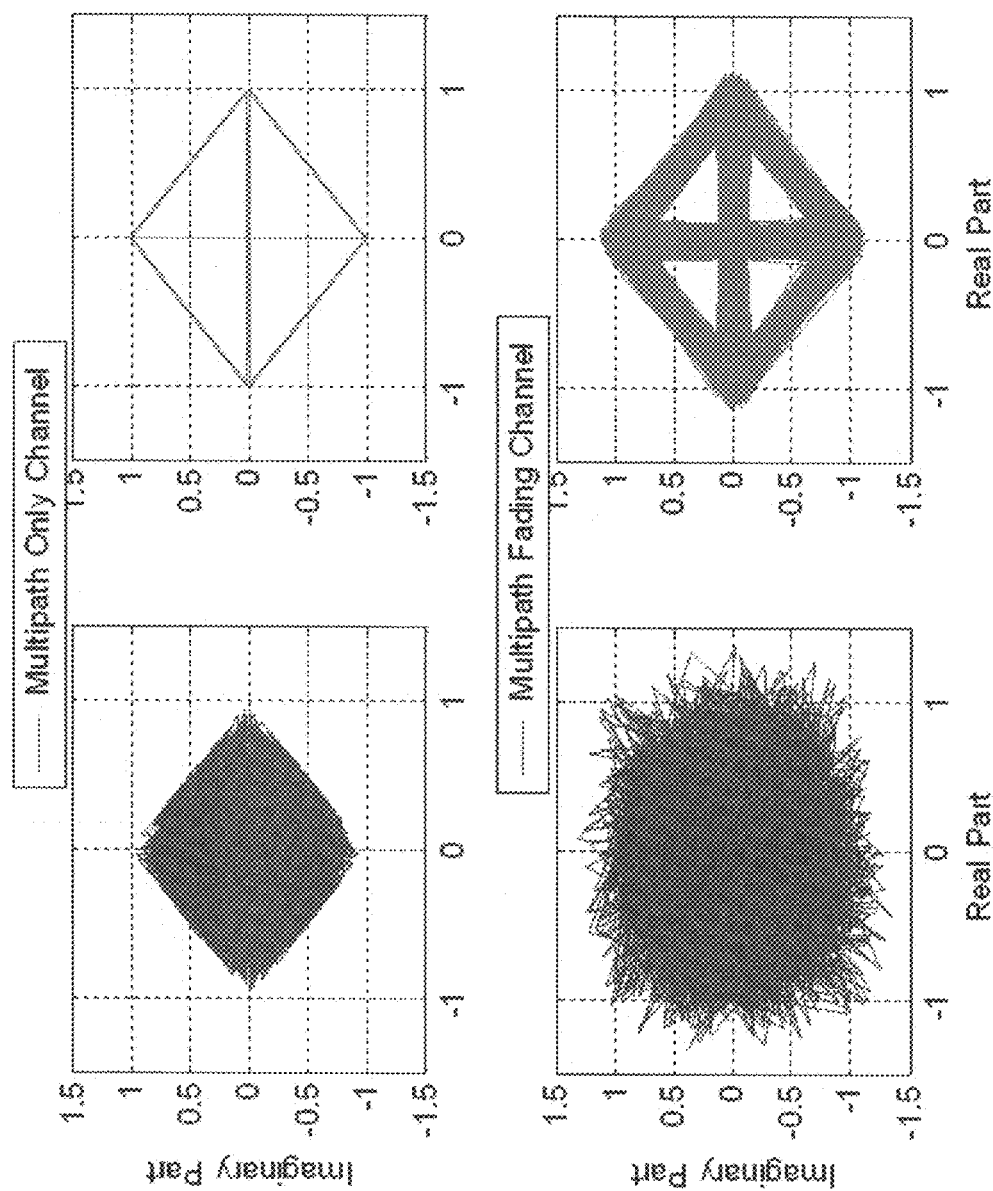
FIG. 13 illustrating the constellation diagrams for noiseless QPSK before equalization (left) and after equalization (right)

FIG. 13, visualizes the successful outcome of the described equalization process by comparing noiseless QPSK constellations before and after SC linear MMSE FDE. In non-faded multipath conditions, the equalized constellation appears again to be perfect. In multipath fading conditions, however, some noise-like interference remains.

Bluetooth Demodulation Performance in Multipath Propagation Using SC Linear MMSE FDE In FIGS. 14, 15, 16 and FIG. 17, the Bluetooth EDR demodulation performance using SC linear MMSE FDE is demonstrated. In addition, the simulated impact of multipath propagation on Bluetooth EDR demodulation performance is shown.

For the 2-path multipath propagation model, the power of the second path is varied relative to the first arriving path.

Figure 14:
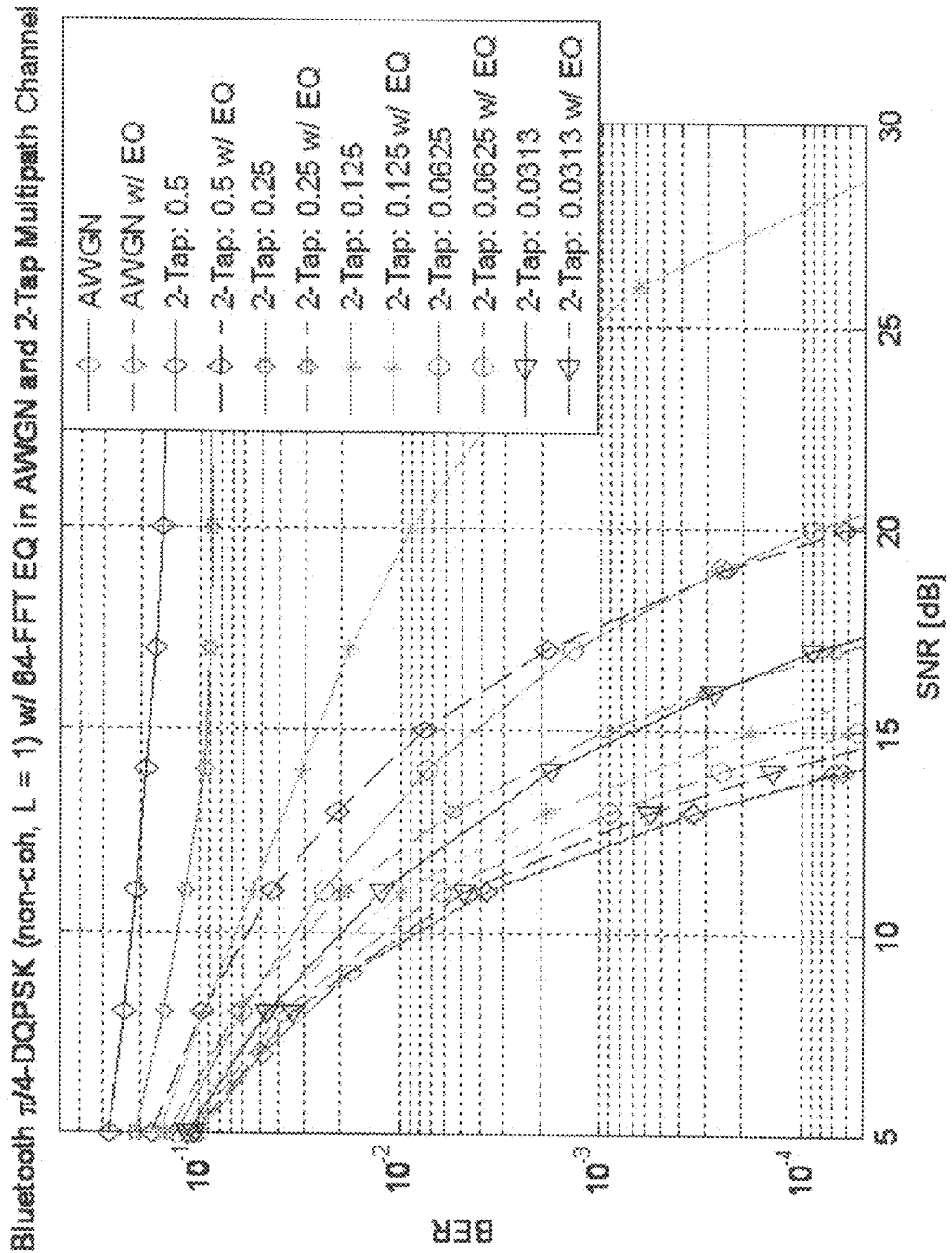
FIG. 14 illustrating the performance of Pi/4-DQPSK and FDE in 2-path multipath (N=64)

In FIG. 14, one can see that for Pi/4-DQPSK and severe multipath conditions (second path as high as -3 dB ($10 \log_{10}(0.5)$)), the degradation in demodulation performance is limited to 3 dB. The FFT size applied equals 64.

Figure 15:
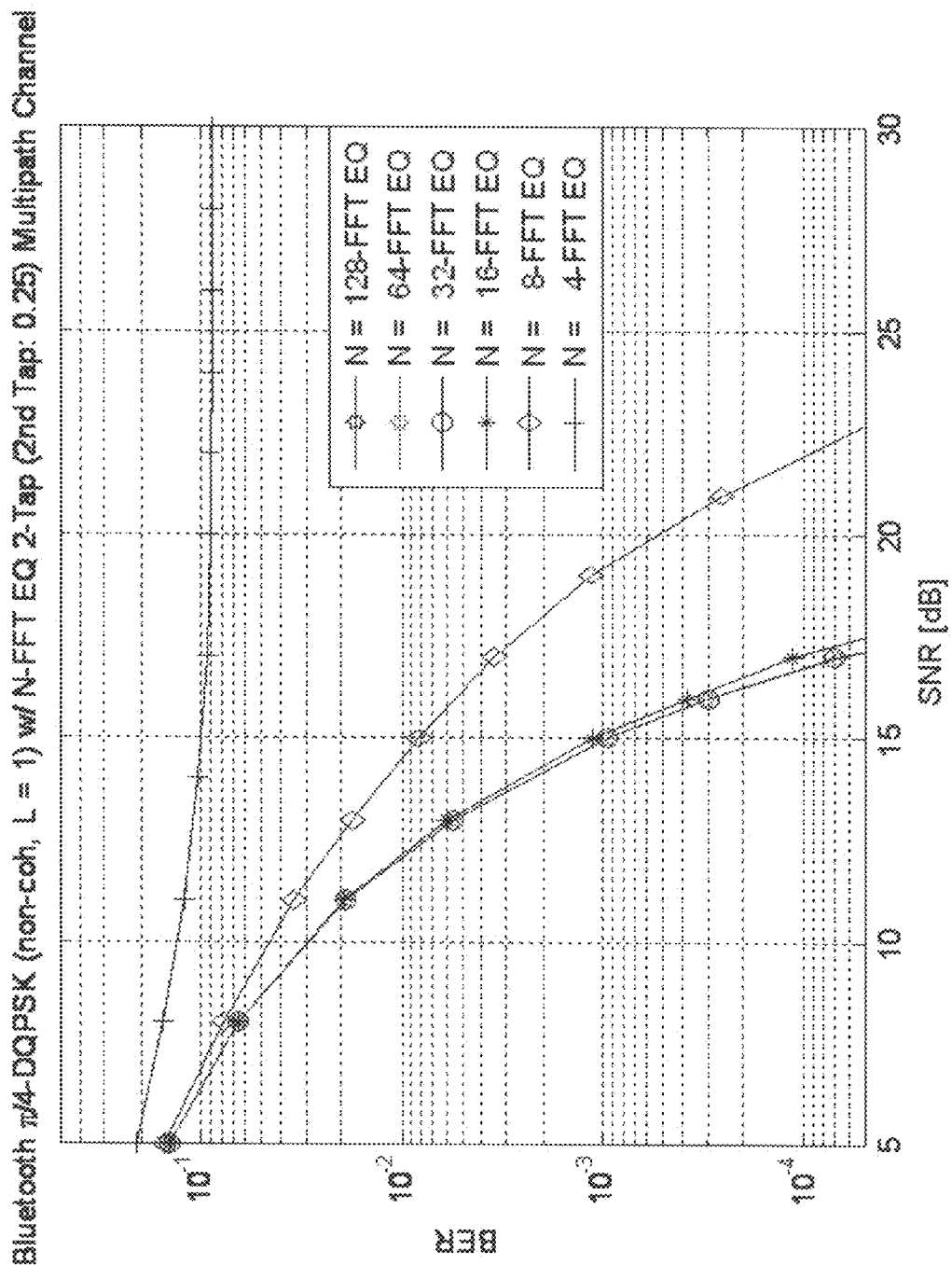
FIG. 15 illustrating the performance of Pi/4-DQPSK and FDE in 2-path multipath (varying N)

In FIG. 15, one can see that for Pi/4-DQPSK and a strong second path (-6 dB), M=128 and M=32 perform as well as M=64. Even M=16 performs within 1 dB of the optimum performance (M=128). Very small FFT sizes (M<16) cause severe degradation in equalization (and therefore demodulation) performance.

Figure 16:
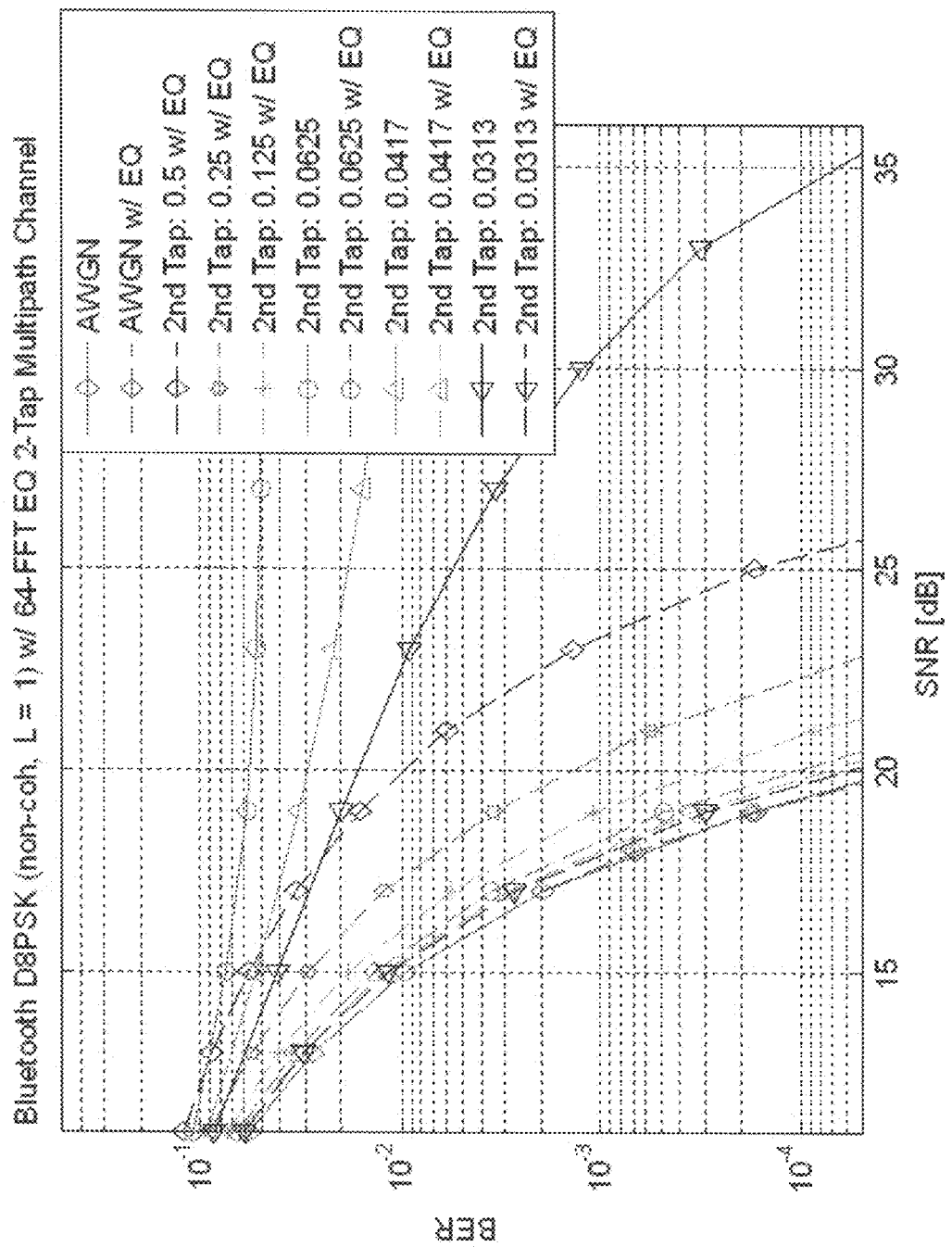
FIG. 16 illustrating the performance of D8PSK and FDE in 2-path multipath (N=64)

In FIG. 16, one can see that for D8PSK and severe multipath conditions (second path as high as −3 dB ($10 \log_{10}(0.5)$)), the degradation in demodulation performance is limited to 3 dB. The FFT size M applied equals 64.

Figure 17:
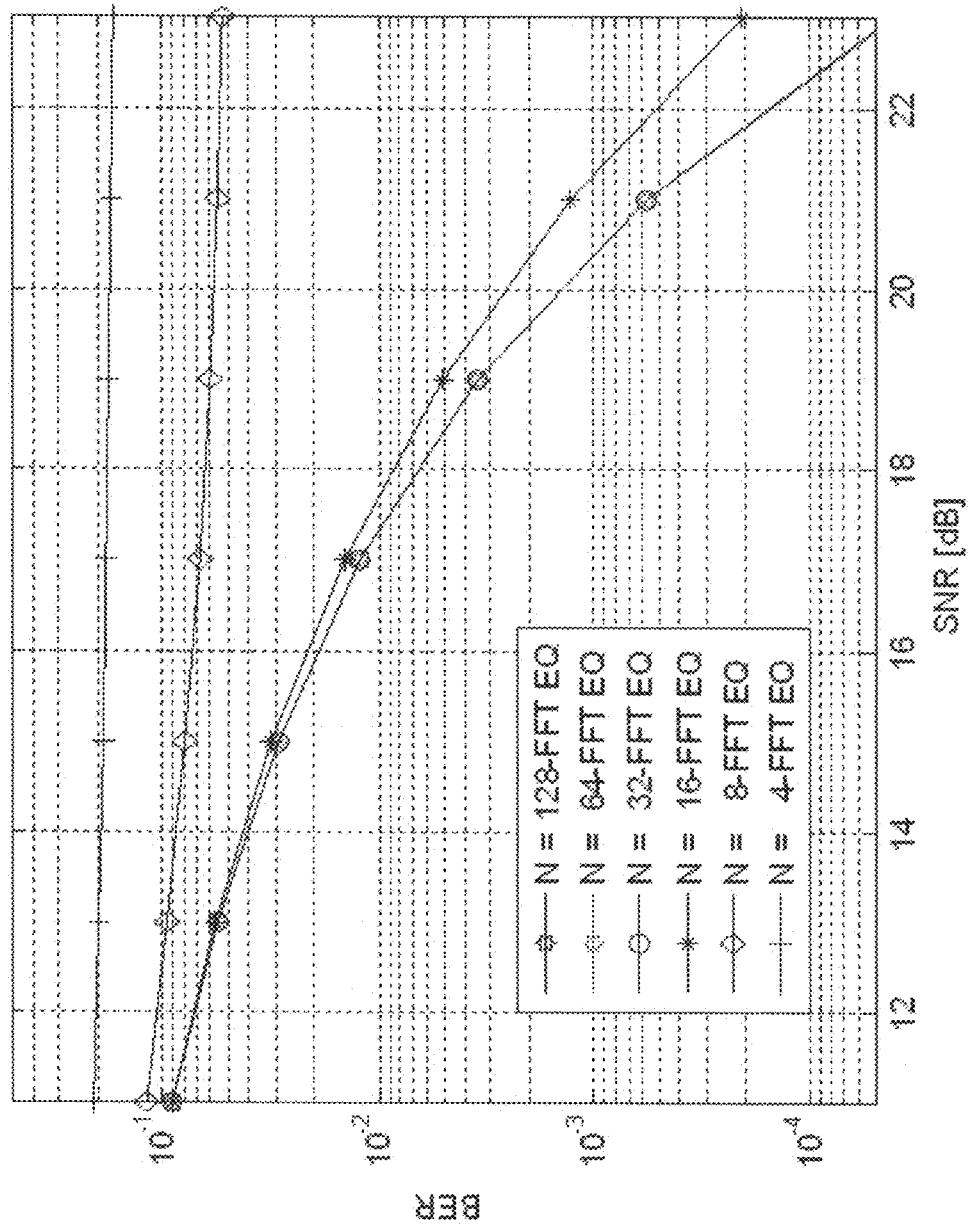
FIG. 17 illustrating the performance of D8PSK and FDE in 2-path multipath (varying N)

In FIG. 17, one can see that for D8PSK and a strong second path (-6 dB), M=128 and M=32 perform as well as M=64. Even M=16 performs within 2 dB of the optimum performance (M=128). Very small FFT sizes (M<16) cause severe degradation in equalization (and therefore demodulation) performance.

It was shown that for Bluetooth SC linear MMSE FDE can be used to efficiently mitigate severe ISI introduced by multipath propagation (second path as high as −3 dB ($10 \log_{10}(0.5)$)). In addition, it was demonstrated that using FFT sizes as small as M=16 still allow for equalization (and therefore demodulation) performance within 2 dB of the optimum performance using M=128.

Integration with a Bluetooth Receiver

In this section, it is described how to integrate the SC linear MMSE FDE into a Bluetooth receiver. The integration is described on a conceptual system level.

The SC linear MMSE FDE is assumed to be used for EDR only. However, it can also be used for Basic Rate without modifications.

Figure 18A:
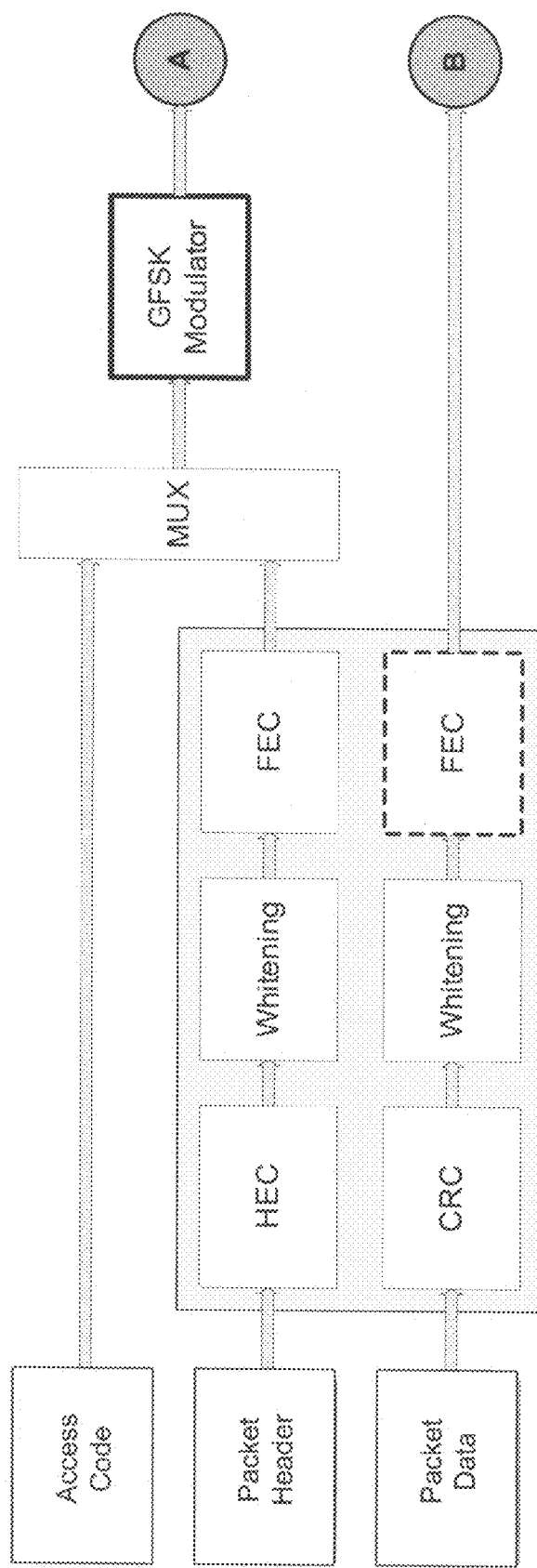
FIGS. 18A, 18B and 18C illustrating the functional block diagram of Bluetooth transmitter.
Figure 18B:
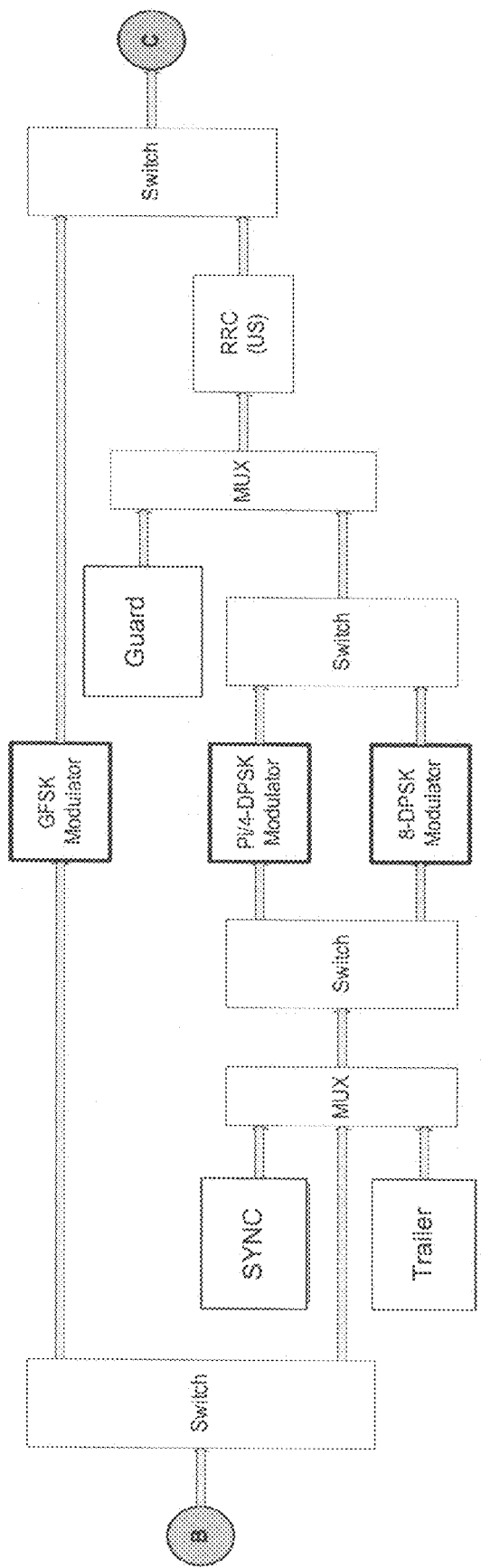
Figure 18C:
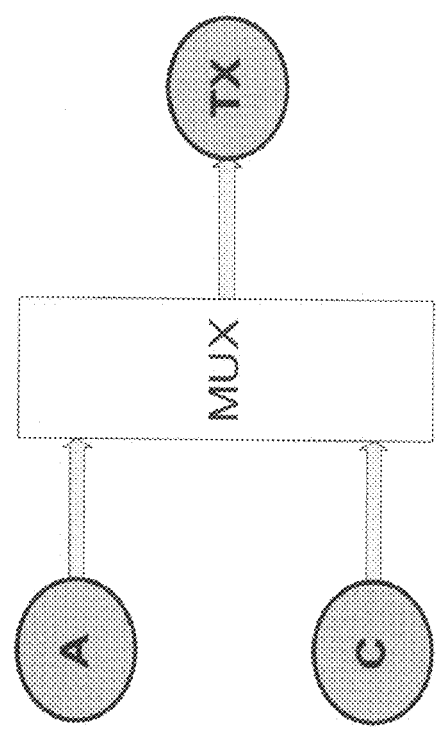

In FIG. 18A, FIG. 18B and FIG. 18C, a (simplified) functional block diagram of a Bluetooth transmitter according to [BT SIG EDR] is shown:

FIG. 18A
The packet header and the packet data (payload) undergo bitstream processing as described in Volume 2 Core System Package, Part B Baseband Specification, Chapter 7: Bitstream Processing (encryption is not shown).
Bitstream-processed packet header and access code are multiplexed as described in Volume 2 Core System Package, Part B Baseband Specification, Chapter 6: Packets.
Bitstream-processed and multiplexed packet header and access code are GFSK modulated as described in Volume 2 Core System Package, Part A Radio Specification, Chapter 3: Transmitter Characteristics.

Figure 19:
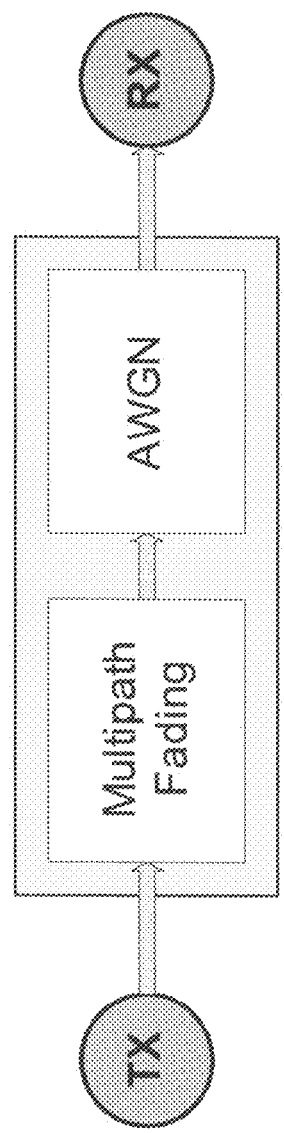
FIG. 19 illustrating the functional block diagram of radio channel model for Bluetooth transmission: introduction of multipath fading and additive White Gaussian Noise (AWGN)

FIG. 18B
Bitstream-processed packet data (payload) is switched between either Basic Rate or EDR processing:
Basic Rate: Bitstream-processed packet data (payload) is GFSK modulated
EDR: Sync sequence and trailer are multiplexed with bitstream-processed packet data (payload)
EDR: Multiplexed sync sequence/trailer//bitstream-processed packet data (payload) is switched between Pi/4-DQPSK modulation or D8PSK modulation
EDR: Multiplexed and modulated sync sequence/trailer//bitstream-processed packet data (payload) is multiplexed with guard
EDR: guard and multiplexed and modulated sync sequence/trailer//bitstream-processed packet data (payload) is filtered upsampled (US) with root-raised-cosine (RRC) filter as described in Volume 2 Core System Package, Part A Radio Specification, Chapter 3: Transmitter Characteristics FIG. 18C
Processed access code, packet header and packet data (payload) is multiplexed forming a complete transmit packet In FIG. 19, a functional block diagram of the radio channel model used for Bluetooth transmission is depicted. It introduces multipath fading according to the model described in prior art. Also, it introduces Additive White Gaussian Noise (AWGN).

Figure 20A:
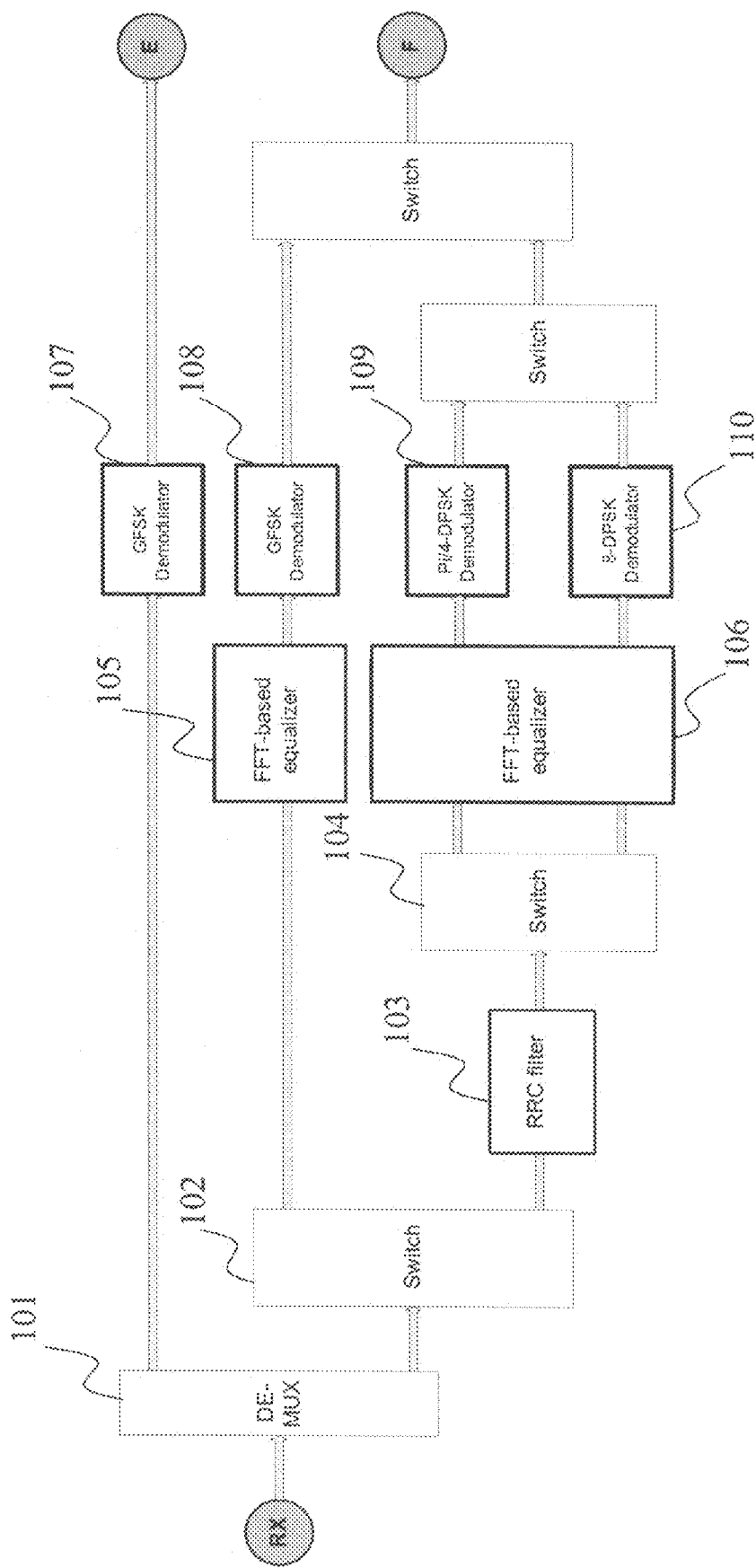
FIGS. 20A and 20B illustrating the functional Block Diagram of Bluetooth Receiver according to one embodiment of the present invention.
Figure 20B:
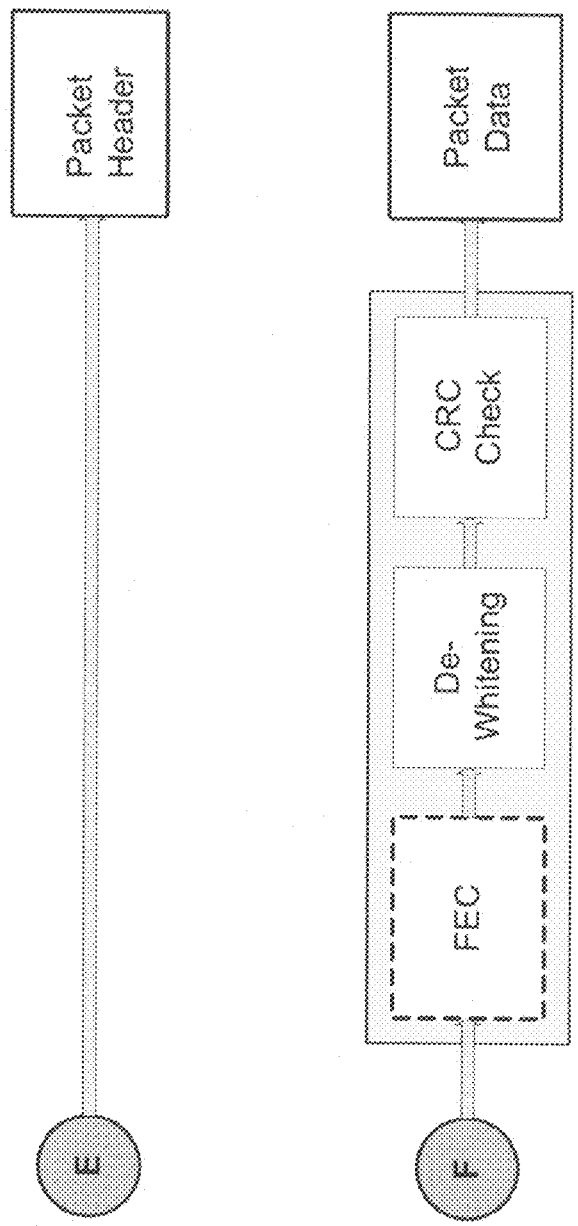

In FIG. 20A and FIG. 20B, a (simplified) functional block diagram of a Bluetooth receiver is shown:

FIG. 20A
A de-multiplxer 101 demultiplexing packet header and packet data (payload) (access code-related processing is not shown)
Packet data (payload) is switched by a switch 102 between either Basic Rate or EDR processing:
Basic Rate: packet data (payload) is processed by a FFT-based equalizer 105, and then demodulated by a GFSK demodulator 108.
Basic Rate: optional equalization of packet header using SC linear MMSE FDE (estimation of channel impulse response not shown).
Basic Rate: GFSK demodulation of packet header by a GFSK demodulator 107.
EDR: Packet data (payload) is filtered downsampled (DS) with root-raised-cosine (RRC) filter 103 (guard, sync sequence and trailer processing is not shown).
EDR: filtered packet data (payload) is switched by a switch 104 between Pi/4-DQPSK demodulation or D8PSK demodulation.
EDR: equalization of packet data (payload) using SC linear MMSE FDE (estimation of channel impulse response not shown)
EDR: Pi/4-DQPSK demodulation or 8-DPSK demodulation of packet data (payload) by a Pi/4-DQPSK demodulator 109 or an 8-DPSK demodulator 110.

FIG. 20B
EDR: reverse bitstream-processing on packet data (payload)

The key in the description of the (simplified) processing flow in a Bluetooth receiver applying BlueWARP technology is the positioning of SC linear MMSE FDE directly before Pi/4-DQPSK demodulation or D8PSK demodulation.

Accordingly, one of features of the present invention is to provide a method for reception of long-range signals in Bluetooth. The method has outstanding performance of long transmission range Bluetooth service based on power class 1 devices and performance improvement of Bluetooth service based on power class 2 and 3 devices in multipath environment.

Accordingly, one embodiment of the present invention provides a apparatus for reception of long-range signals in Bluetooth. The Low-complexity/high-performance FFT/IFFT-based MMSE SC FDE receiver architecture is used for all Bluetooth transmission modes and has highly efficient implementation by reuse of the FFT/IFFT circuitry in the context of multi-standard devices, Although the present invention has been explained in relation to its preferred embodiment, it is to be understood that other modifications and variation can be made without departing the spirit and scope of the invention as hereafter claimed.

What is claimed is:

1. Apparatus for reception of long-range signals in Bluetooth for all transmission modes on power class 1, power class 2 and power class 3, the apparatus comprising:
   a first equalizer, receiving and processing first packet data;
   a first GPSK demodulator, receiving said first packet data from said first equalizer and demodulating said first packet data;
   a root-raised-cosine (RRC) filter, downsampling second packet data;
   a second equalizer, receiving and processing third packet data and fourth packet data, wherein said second equalizer has an impulse response limited by circular convolution with a rectangular window RW transformed into frequency domain $$\hat{a}_{MMSE} = F^{-1}\left\{\left(\frac{(F\{\hat{h}\})^*}{(F\{\hat{h}\})^* \cdot F\{\hat{h}\} + \sigma^2} \otimes RW\right) \cdot F(r)\right\}$$

or by multiplication with a rectangular window rwin time domain for short FFT/IFFT size $$\hat{a}_{MMSE} = F^{-1}\left\{F\left\{F^{-1}\left\{\frac{(F\{\hat{h}\})^*}{(F\{\hat{h}\})^* \cdot F\{\hat{h}\} + \sigma^2}\right\} \cdot rw\right\} \cdot F(r)\right\}$$

a Pi/4-DQPSK demodulator, receiving said third packet data from said second equalizer and demodulating said third packet data; and
   an 8-DPSK demodulator, receiving fourth packet data from said second equalizer and demodulating said fourth packet data.

2. The apparatus for reception of long-range signals in Bluetooth according to claim 1, further comprising a de-multiplexer receiving signals from antenna and producing packet header and packet data.

3. The apparatus for reception of long-range signals in Bluetooth according to claim 2, further comprising a second GFSK demodulator, receiving and processing said packet header.

4. The apparatus for reception of long-range signals in Bluetooth according to claim 2, further comprising a first switch receiving said packet data from said de-multiplexer to output said first packet data or said second packet data.

5. The apparatus for reception of long-range signals in Bluetooth according to claim 2, further comprising a second switch receiving said second packet data from said root-raised-cosine (RRC) filter to produce said third packet data or said fourth packet data to said second equalizer.

6. The apparatus for reception of long-range signals in Bluetooth according to claim 1, wherein said first equalizer is an FFT-based or IFFT-based equalizer.

7. The apparatus for reception of long-range signals in Bluetooth according to claim 1, wherein said first packet data is basic rate transmit data.

8. The apparatus for reception of long-range signals in Bluetooth according to claim 1, wherein said second equalizer is an FFT-based or IFFT-based equalizer.

9. The apparatus for reception of long-range signals in Bluetooth according to claim 1, wherein said second packet data, third packet data and fourth packet data are enhance data rate (EDR) transmit data.

* * * * *